US011368788B2

(12) United States Patent
Kagoshima (10) Patent No.: US 11,368,788 B2
(45) Date of Patent: Jun. 21, 2022

(54) SIGNAL PROCESSING APPARATUS AND SIGNAL PROCESSING METHOD (71) Applicant: KABUSHIKI KAISHA TOSHIBA, Minato-ku (JP)

(72) Inventor: Takehiko Kagoshima, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 73 days.

(21) Appl. No.: 16/795,799

(22) Filed: Feb. 20, 2020

(65) Prior Publication Data
US 2021/0067867 A1 Mar. 4, 2021

(30) Foreign Application Priority Data

Aug. 30, 2019 (JP) .............................. JP2019-158133

(51) Int. Cl.
*H04R 1/32* (2006.01)
*G10L 15/22* (2006.01)
*G10L 15/08* (2006.01)

(52) U.S. Cl.
CPC ................ *H04R 1/32* (2013.01); *G10L 15/08* (2013.01); *G10L 15/22* (2013.01)

(58) Field of Classification Search
CPC ....... G10L 15/22; G10L 15/063; G10L 15/25; G10L 25/78; G10L 2015/0635; G10L 15/08; G05D 3/20; G06K 9/00248; G06K 9/00281; H04R 1/406; H04R 3/005; H04R 1/32
See application file for complete search history.

(56) References Cited

U.S. PATENT DOCUMENTS

| 8,958,570 | B2* | 2/2015 | Matsuo | H04R 3/005 381/92 |
|---|---|---|---|---|
| 9,311,527 | B1* | 4/2016 | Yin | G06T 7/73 |
| 9,621,984 | B1* | 4/2017 | Chu | G06F 3/165 |
| 10,242,666 | B2* | 3/2019 | Monceaux | G10L 15/22 |
| 10,313,817 | B2* | 6/2019 | Shi | G06F 3/165 |
| 10,629,226 | B1* | 4/2020 | Tong | G10L 15/02 |
| 10,839,822 | B2* | 11/2020 | Chen | G06N 3/0445 |
| 10,999,691 | B2* | 5/2021 | Wang | H04S 3/008 |

(Continued)

FOREIGN PATENT DOCUMENTS

| EP | 3370232 A1 * | 9/2018 | ............. G01S 17/86 |
|---|---|---|---|
| JP | 5952692 B2 | 7/2016 | |
| JP | 2018-146610 A | 9/2018 | |

*Primary Examiner* — Mohammad K Islam
(74) *Attorney, Agent, or Firm* — Oblon, McClelland, Maier & Neustadt, L.L.P.

(57) ABSTRACT

According to one embodiment, a signal processing apparatus includes the following units. The transform unit transforms a first signal into a time-frequency domain to obtain a second signal, the first signal obtained by detecting sound at each of different positions. The first calculation unit calculates a first spatial correlation matrix based on the second signal. The second calculation unit calculates a second spatial correlation matrix based on a third signal obtained by delaying the second signal by a predetermined time. The spatial filter unit generates a spatial filter based on the first spatial correlation matrix and the second spatial correlation matrix, and filters the second signal by using the spatial filter.

9 Claims, 9 Drawing Sheets (56) References Cited

U.S. PATENT DOCUMENTS

| | | | |
|---|---|---|---|
| 2007/0192910 A1* | 8/2007 | Vu | B25J 19/06 |
| | | | 700/245 |
| 2010/0034397 A1* | 2/2010 | Nakadai | H04R 1/406 |
| | | | 381/58 |
| 2013/0316691 A1* | 11/2013 | Forutanpour | H04R 3/005 |
| | | | 455/418 |
| 2014/0072142 A1 | 3/2014 | Nakadai et al. | |
| 2015/0281833 A1* | 10/2015 | Shigenaga | H04R 3/005 |
| | | | 381/92 |
| 2017/0094223 A1* | 3/2017 | Burenius | H04N 7/147 |
| 2017/0251300 A1* | 8/2017 | Kanamori | G10L 21/0232 |
| 2017/0278513 A1* | 9/2017 | Li | G10L 21/0224 |
| 2018/0047407 A1* | 2/2018 | Mitsufuji | G10L 21/028 |
| 2018/0255395 A1* | 9/2018 | Kanamori | G01S 17/86 |
| 2018/0374494 A1* | 12/2018 | Yamaya | G06K 9/00523 |
| 2019/0025400 A1* | 1/2019 | Venalainen | H04R 3/005 |
| 2019/0206400 A1* | 7/2019 | Cui | G05D 1/0231 |
| 2019/0259381 A1* | 8/2019 | Ebenezer | H04R 3/005 |
| 2019/0306620 A1* | 10/2019 | Hayashida | G01S 3/8006 |
| 2020/0011967 A1* | 1/2020 | Iizuka | G01S 13/68 |
| 2020/0077185 A1* | 3/2020 | Nakadai | H04R 1/406 |
| 2020/0225344 A1* | 7/2020 | Yoon | G01H 3/125 |
| 2021/0067867 A1* | 3/2021 | Kagoshima | G10L 21/0208 |

\* cited by examiner

SIGNAL PROCESSING APPARATUS AND SIGNAL PROCESSING METHOD

CROSS-REFERENCE TO RELATED APPLICATIONS

This application is based upon and claims the benefit of priority from Japanese Patent Application No. 2019-158133, filed Aug. 30, 2019, the entire contents of which are incorporated herein by reference.

FIELD

Embodiments described herein relate generally to a signal processing apparatus and a signal processing method.

BACKGROUND

A signal processing technology for suppressing noise and enhancing speech has been developed to correctly recognize speech uttered by a user in a noisy environment.

DETAILED DESCRIPTION

According to one embodiment, a signal processing apparatus includes a transform unit, a first calculation unit, a second calculation unit, and a spatial filter unit. The transform unit is configured to transform a first detection signal into a time-frequency domain to obtain a second detection signal, the first detection signal obtained by detecting sound at each of different positions. The first calculation unit is configured to calculate a first spatial correlation matrix based on the second detection signal. The second calculation unit is configured to calculate a second spatial correlation matrix based on a third detection signal obtained by delaying the second detection signal by a predetermined time. The spatial filter unit is configured to generate a spatial filter based on the first spatial correlation matrix and the second spatial correlation matrix, and filter the second detection signal by using the spatial filter.

Hereinafter, embodiments will be described with reference to the accompanying drawings. One embodiment is directed to a signal processing apparatus which generates an acoustic signal with a target speech enhanced from acoustic signals collected using a plurality of microphones. As a non-limiting example, the signal processing apparatus is mounted in remote controllers for operating home appliances. In the embodiments described herein, the signal processing apparatus is mounted in the remote controller of an air conditioner. The remote controller controls the air conditioner in response to the utterance of pre-registered words (hereinafter referred to as "command words" or "keywords") such as "turn on the switch" and "raise the temperature".

First Embodiment

Figure 1:
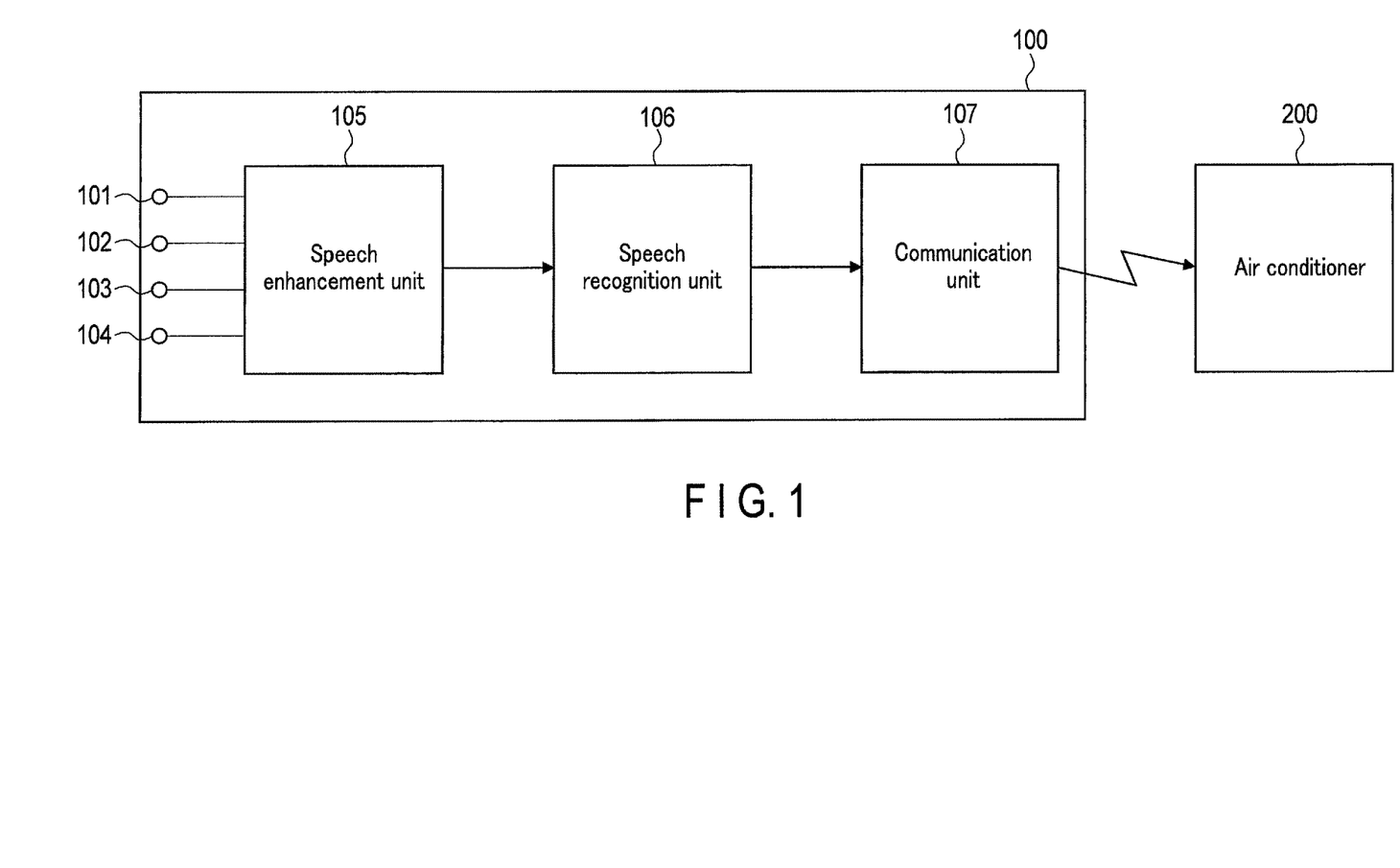
FIG. 1 is a block diagram showing a remote controller including a signal processing apparatus according to a first embodiment.
Figure 2:
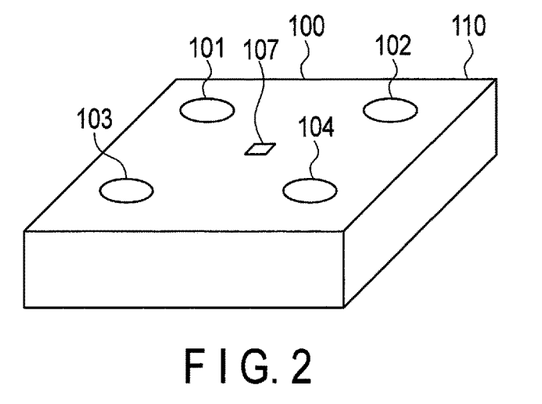
FIG. 2 is a perspective view showing an external appearance of the remote controller shown in FIG. 1.

FIG. 1 is a block diagram schematically showing a remote controller 100 including a signal processing apparatus according to a first embodiment. FIG. 2 is a perspective view schematically showing an external appearance of the remote controller 100.

As shown in FIG. 1, the remote controller 100 is an electronic device used to remotely control an air conditioner 200. The remote controller 100 recognizes speech uttered by a user, and wirelessly transmits a control signal corresponding to the speech to the air conditioner 200. For example, when the user says "turn on the switch," the remote controller 100 transmits a control signal that instructs activation to the air conditioner 200. The air conditioner 200 operates according to the control signal received from the remote controller 100.

The remote controller 100 includes a plurality of microphones (in this example, four microphones 101 to 104), a speech enhancement unit 105, a speech recognition unit 106, and a communication unit 107. The speech enhancement unit 105 corresponds to the signal processing apparatus of the first embodiment. The signal processing apparatus may further include at least one element (e.g., the speech recognition unit 106) other than the speech enhancement unit 105.

The microphones 101 to 104 detect sound to generate respective detection signals (acoustic signals). When the user utters a command word, each detection signal includes a first portion which includes noise, a second portion which is subsequent to the first portion and which includes noise and the utterance of the command word, and a third portion which subsequent to the second portion and which includes noise. As shown in FIG. 2, the microphones 101 to 104 are arranged on a surface of a housing 110 of the remote controller 100, with space between the respective microphones. Therefore, a sound collector including the four microphones 101 to 104 outputs a set of detection signals obtained by detecting sound at different positions. Neither the number nor the arrangement of microphones is limited to the example shown in FIG. 2.

Referring back to FIG. 1, the speech enhancement unit 105 receives detection signals from the microphones 101 to 104. The speech enhancement unit 105 performs speech enhancement processing on the received detection signals, and outputs an enhanced-speech signal. The speech enhancement processing refers to signal processing for suppressing noise and enhancing target speech (specifically, the utterance of a command word). The details of the speech enhancement unit 105 will be described later with reference to FIGS. 3 and 4.

The speech recognition unit 106 receives the enhanced-speech signal from the speech enhancement unit 105. The speech recognition unit 106 performs detection of one or more pre-registered command words with respect to the received enhanced-speech signal. For example, the speech recognition unit 106 performs speech recognition on the received enhanced-speech signal, and determines whether or not a command word is included in the result of the speech recognition. When the speech recognition unit 106 detects any one of the pre-registered command words, the speech recognition unit 106 outputs a command word ID as identification information for identifying the detected command word.

The communication unit 107 receives the command word ID from the speech recognition unit 106. The communication unit 107 generates a control signal corresponding to the received command word ID, and transmits the control signal to the air conditioner 200, for example, with infrared rays.

Figure 3:
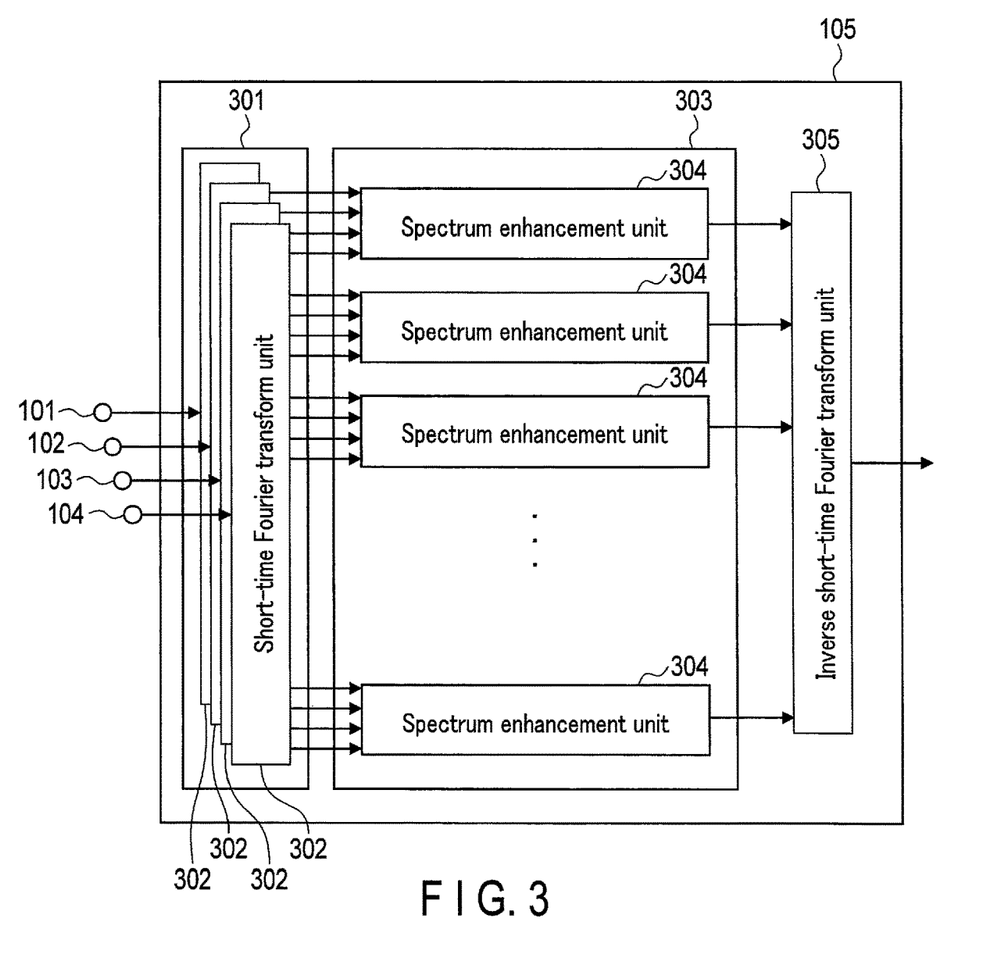
FIG. 3 is a block diagram showing an example of a configuration of a speech enhancement unit shown in FIG. 1.

FIG. 3 is a block diagram schematically showing an example of a configuration of the speech enhancement unit 105. As shown in FIG. 3, the speech enhancement unit 105 includes a transform unit 301, an enhancement unit 303, and an inverse short-time Fourier transform (ISTFT) unit 305.

The transform unit 301 receives detection signals from four channels corresponding to the microphones 101 to 104. The transform unit 301 transforms the received detection signals individually into a time-frequency domain through short-time Fourier transform, and outputs a frequency spectrum $X_m(f,n)$. Herein, f denotes a frequency bin number, n denotes a frame number, and m denotes a microphone number or a channel number.

Specifically, the transform unit 301 includes short-time Fourier transform (STFT) units 302 respectively corresponding to the microphones 101 to 104. Each STFT unit 302 performs short-time Fourier transform on the detection signal received from its corresponding microphone among the microphones 101 to 104. For example, the STFT unit 302 corresponding to the microphone 101 applies a window function to the detection signal received from the microphone 101 to generate a plurality of frames, performs Fourier transform on each of the frames, and outputs a frequency spectrum $X_1(f,n)$. For example, when a sampling frequency is set to 16 kHz, a frame length (window function length) is set to 256 samples, and a frame shift is set to 128 samples, the frequency spectrum of each frame has 129 complex values in the range of $0 \leq f \leq 128$ in consideration of the symmetry between a low frequency and a high frequency. The frequency spectrum $X_1(f,n)$ of the n-th frame related to the microphone 101 has $X_1(0, n), X_1(1, n), \ldots,$ and $X_1(128, n)$.

A four-dimensional vector integrating the frequency spectra of the four channels is represented as follows:

$$X(f,n) = [X_1(f,n), X_2(f,n), X_3(f,n), X_4(f,n)]^T$$

wherein T denotes transposition of a matrix. Hereinafter, the frequency spectra $X_1(f,n)$, $X_2(f,n)$, $X_3(f,n)$, and $X_4(f,n)$ of the four channels are collectively indicated as a frequency spectrum $X(f,n)$.

The enhancement unit 303 receives the frequency spectrum $X(f,n)$ from the transform unit 301. The enhancement unit 303 performs spectrum enhancement on the frequency spectrum $X(f,n)$ for each frame and each frequency bin (namely, for each time-frequency point), and outputs a frequency spectrum of an enhanced speech. The spectrum enhancement refers to signal processing for enhancing a spectrum of the utterance of a command word and suppressing a spectrum of noise. The spectrum enhancement will be detailed later with reference to FIG. 4.

Specifically, the enhancement unit 303 includes spectrum enhancement units 304 corresponding to the respective frequency bins. Each of the spectrum enhancement units 304 receives a frequency spectrum $X(i,n)$ from the transform unit 301, and performs spectrum enhancement on the received frequency spectrum $X(i,n)$ for each frame. Herein, i denotes an integer of 0 to 128.

The ISTFT unit 305 receives the frequency spectrum of the enhanced speech from the spectrum enhancement unit 304. The ISTFT unit 305 performs inverse short-time Fourier transform on the received frequency spectrum of the enhanced speech and outputs an enhanced-speech signal. The inverse short-time Fourier transform includes inverse Fourier transform processing and waveform superposition processing.

A configuration in which the ISTFT unit 305 is not provided and the speech recognition unit 106 receives the frequency spectrum of the enhanced speech output from the spectrum enhancement unit 304 may be adopted. With this configuration, it may be possible to omit the processing performed by the ISTFT unit 305 and the short-time Fourier transform processing performed by the speech recognition unit 106, resulting in an reduction of the amount of calculation.

Figure 4:
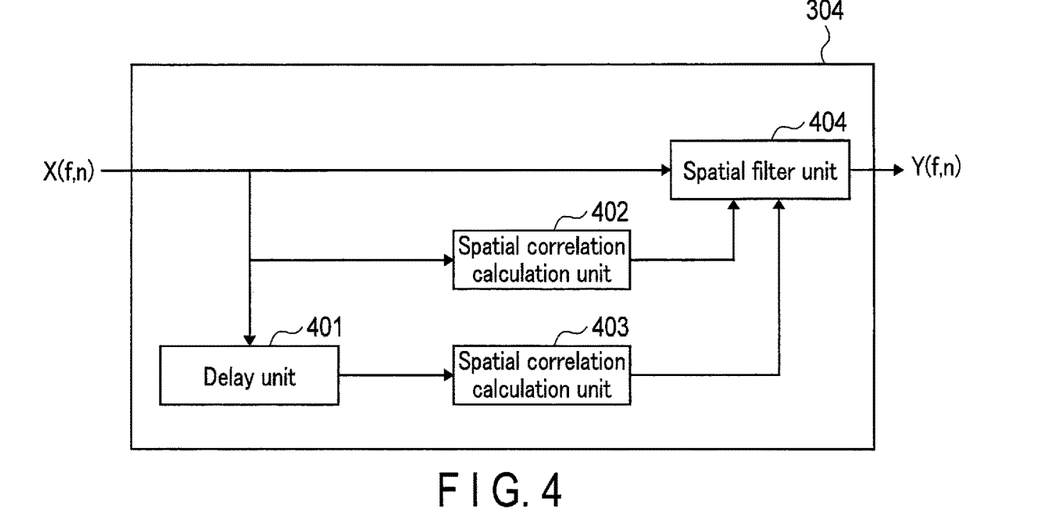
FIG. 4 is a block diagram showing an example of a configuration of a spectrum enhancement unit shown in FIG. 3.

FIG. 4 is a block diagram schematically showing an example of a configuration of the spectrum enhancement unit 304. The spectrum enhancement unit 304 shown in FIG. 4 corresponds to each of the spectrum enhancement units 304 shown in FIG. 3.

The spectrum enhancement unit 304 includes a delay unit 401, a spatial correlation calculation unit 402, a spatial correlation calculation unit 403, and a spatial filter unit 404. In the spectrum enhancement unit 304, the frequency spectrum $X(f,n)$ from the transform unit 301 is provided to the spatial correlation calculation unit 402 and the spatial filter unit 404, and provided to the spatial correlation calculation unit 403 through the delay unit 401.

The delay unit 401 delays the frequency spectrum $X(f,n)$ by a predetermined time. The delay time may be set so that the duration of the utterance of one command word, which is a piece of speech to be enhanced, is approximately equal to or less than the delay time. When the command word is as short as "turn on the switch," for example, the duration of the utterance of the command word can be assumed to be one second or less. In this case, the delay time is set to one second, for example. The delay time of one second is equal to delay of $125 (=16000 \times 1/128)$ frames. Namely, the delay unit 401 buffers data of 125 frames and outputs a frequency spectrum $X(f, n-125)$.

The spatial correlation calculation unit 402 calculates a spatial correlation matrix based on the frequency spectrum $X(f,n)$ received from the transform unit 301. The spatial correlation matrix is information indicating a spatial correlation between channels. For example, the spatial correlation calculation unit 402 calculates, from the frequency spectrum X(f,n), a spatial correlation matrix $\Phi_S(f,n)$ represented by the following formula (1):

$$\Phi_S(f, n) = \sum_{t=0}^{\tau_S-1} w_S(t) \, X(f, n-t) X(f, n-t)^H \quad (1)$$

where $w_S(t)$ denotes a window function representing a weight of each frame, $\sigma_S$ denotes a length of the window function $w_S(t)$, and H denotes conjugate transposition. The elements $w_S(t)$ and $\sigma_S$ may be set so as to satisfy the following formula (2):

$$\sum_{t=0}^{d-1} w_S(t) > \sum_{t=d}^{\tau_S-1} w_S(t) \quad (2)$$

where d denotes the number of delayed frames. In one example, $\sigma_S=100$, and $w_S(t)=1$. In another example, $\sigma_S=\infty$, and $w_S(t)=\alpha_S^t$, wherein $\alpha_S$ is set to a sufficiently small value in the range of $0<\alpha_S<1$. In this case, the spatial correlation matrix $\Phi_S(f,n)$ can be calculated with minimal calculation using a recurrence relation represented by the following formula (3):

$$\Phi_S(f,n)=\alpha_S \Phi_S(f,n-1)+(1-\alpha_S)X(f,n)X(f,n)^H \quad (3)$$

The spatial correlation calculation unit 403 calculates a spatial correlation matrix based on the frequency spectrum X(f,n−d) received from the delay unit 401. For example, the spatial correlation calculation unit 403 calculates, by using the frequency spectrum X(f,n−d), a spatial correlation matrix $\Phi_N(f,n)$ represented by the following formula (4):

$$\Phi_N(f, n) = \sum_{t=0}^{\tau_N-1} w_N(t) \, X(f, n-d-t) X(f, n-d-t)^H \quad (4)$$

wherein $w_N(t)$ denotes a window function representing a weight of each frame, and $\sigma_N$ denotes a length of the window function $w_N(t)$. In one example, $\sigma_N=200$, and $w_N(t)=1$. In another example, $\sigma_N=\infty$, and $w_N(t)=\alpha_N^t$, wherein $\alpha_N$ is set to a sufficiently small value in the range of $0<\alpha_N<1$. In this case, the spatial correlation matrix $\Phi_N(f,n)$ can be calculated with a small amount of calculation using a recurrence relation represented by the following formula (5):

$$\Phi_N(f,n)=\alpha_N \Phi_N(f,n-1)+(1-\alpha_N)X(f,n-d)X(f,n-d)^H \quad (5)$$

The spatial filter unit 404 generates a spatial filter based on the spatial correlation matrix $\Phi_S(f,n)$ calculated by the spatial correlation calculation unit 402 and the spatial correlation matrix $\Phi_N(f,n)$ calculated by the spatial correlation calculation unit 403, and generates a frequency spectrum of an enhanced speech by filtering the frequency spectrum X(f,n) from the transform unit 301 by using the generated spatial filter. Herein, the spatial filter is represented by a four-dimensional vector as follows:

$$F(f,n)=[F_1(f,n),F_2(f,n),F_3(f,n),F_4(f,n)]^T$$

In this case, the spatial filter unit 404 calculates an output Y(f,n) representing the spectrum of the enhanced speech according to, for example, the following formula (6):

$$Y(f,n)=F(f,n)^H X(f,n) \quad (6)$$

In one example, the spatial filter F(f,n) is obtained as a product of a maximum signal-to-noise ratio (SNR) beamformer $F_{SNR}(f,n)$ and a post-filter w(f,n), as shown in the following formula (7):

$$F(f,n)=w(f,n)F_{SNR}(f,n) \quad (7)$$

The maximum SNR beamformer $F_{SNR}(f,n)$ is a beamformer that maximizes a power ratio between speech and noise, where the spatial correlation matrix $\Phi_S(f,n)$ is regarded as a spatial correlation matrix of speech (signal) and the spatial correlation matrix $\Phi_N(f,n)$ is regarded as a spatial correlation matrix of noise; and the maximum SNR beamformer $F_{SNR}(f,n)$ is obtained as an eigenvector corresponding to a maximal eigenvalue of a matrix $\Phi_N^{-1}(f,n)\Phi_S(f,n)$.

The post-filter w(f,n) adjusts the power of each frequency bin to thereby improve sound quality. For example, the post-filter w(f,n) is obtained by using the following formula (8):

$$w(f,n) = \frac{\sqrt{F_{SNR}^H(f,n)\Phi_N(f,n)\Phi_N(f,n)F_{SNR}(f,n)/4}}{F_{SNR}^H(f,n)\Phi_N(f,n)F_{SNR}(f,n)} \quad (8)$$

Another beamformer obtained based on the spatial correlation matrices $\Phi_S(f,n)$ and $\Phi_N(f,n)$ may be used in place of the maximum SNR beamformer. For example, a minimum variance distortionless response beamformer may be used. When an eigenvector corresponding to a maximal eigenvalue of the spatial correlation matrix $\Phi_S(f,n)$ is a steering vector h(f,n), a spatial filter based on the minimum variance distortionless response beamformer can be obtained by using the following formula (9):

$$F(f,n) = \frac{\Phi_N(f,n)^{-1} h(f,n)}{h(f,n)^H \Phi_N(f,n)^{-1} h(f,n)} \quad (9)$$

In the first embodiment, based on the assumption that the duration of the utterance of the command word is one second or less, when a target speech is being observed at a current time, it is assumed that noise is detected one or more seconds before the current time, and a spatial correlation matrix of the speech and a spatial correlation matrix of the noise is estimated by the above-described method. Therefore, a spatial filter obtained based on the spatial correlation matrix of the speech and the spatial correlation matrix of the noise enhances an arrival direction of the utterance of the command word and suppresses an arrival direction of the noise, thereby operating to enhance the utterance of the command word. Since the principle of this operation is unrelated to acoustic characteristics of noise, an effect can be achieved even if a noise source includes sound such as that of a television.

Figure 5:
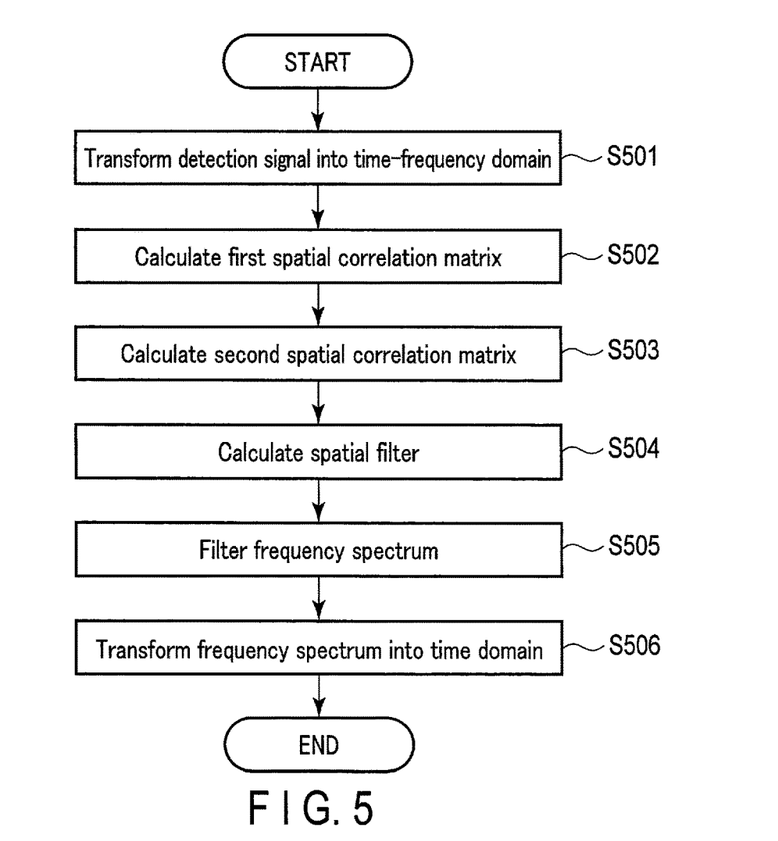
FIG. 5 is a flowchart illustrating an example of an operation of the speech enhancement unit shown in FIG. 1.

FIG. 5 is a flowchart schematically illustrating an example of an operation of the speech enhancement unit 105. In step S501 illustrated in FIG. 5, the speech enhancement unit 105 operates as the transform unit 301, and transforms a first detection signal obtained by detecting sound at each of different positions into a time-frequency domain to obtain a second detection signal. The second detection signal includes a time-frequency component of the first detection signal. Specifically, the first detection signal corresponds to detection signals output from the four microphones 101 to 104, and the second detection signal corresponds to frequency spectra of the four channels represented as the frequency spectrum X(f,n).

The speech enhancement unit 105 performs the processing of steps S502 to S505 for each frame and each frequency bin.

In step S502, the speech enhancement unit 105 operates as the spatial correlation calculation unit 402, and calculates a first spatial correlation matrix based on the second detection signal up to a first time. The first time is a time corresponding to the n-th frame to be processed. For example, the speech enhancement unit 105 calculates the spatial correlation matrix $\Phi_S(f,n)$ according to the above formula (1) or (3). According to the formula (1), the spatial correlation matrix $\Phi^3_S(f,n)$ is calculated based on frequency spectra $X(f,n-\sigma_S+1)$, $X(f,n-\sigma_S+2)$, ..., $X(f,n)$ from the $(n-\sigma_S+1)$-th frame to the n-th frame.

The speech enhancement unit 105 may calculate the spatial correlation matrix $\Phi_S(F,n)$ so that contribution of the second detection signal from a second time to the first time is larger than contribution of the second detection signal up to the second time. The second time is a time prior to the first time by the delay time and corresponding to the (n−d+1)-th frame. The condition that the contribution of the second detection signal from the second time to the first time is larger than the contribution of the second detection signal up to the second time can be achieved by using the window function $w_S(t)$ and the window function length $\sigma_S$ that satisfy the above formula (2).

In step S503, the speech enhancement unit 105 operates as the delay unit 401 and the spatial correlation calculation unit 403, and calculates a second spatial correlation matrix based on a third detection signal obtained by delaying the second detection signal by the delay time. Specifically, the speech enhancement unit 105 calculates the second spatial correlation matrix based on the second detection signal up to the second time. For example, the speech enhancement unit 105 calculates the spatial correlation matrix $\Phi_N(f,n)$ according to the above formula (4) or (5). According to the formula (4), the spatial correlation matrix $\Phi_N(f,n)$ is calculated based on frequency spectra $X(f,n-d-\sigma_N+1)$, $X(f, n-d-\sigma_N+2)$, ..., $X(f,n-d)$ from the $(f,n-d-\sigma_N+1)$-th frame to the (n-d)-th frame.

In step S504, the speech enhancement unit 105 operates as the spatial filter unit 404, and generates a spatial filter based on the first and second spatial correlation matrices calculated in steps S502 and S503. For example, the speech enhancement unit 105 calculates the maximum SNR beamformer $F_{SNR}(f,n)$, where the spatial correlation matrix $\Phi_S(f,n)$ is a spatial correlation matrix of a signal and the spatial correlation matrix $\Phi_N(f,n)$ is a spatial correlation matrix of noise, and calculates the spatial filter F(f,n) based on the generated maximum SNR beamformer $F_{SNR}(f,n)$ according to the above formula (7).

In step S505, the speech enhancement unit 105 operates as the spatial filter unit 404, and filters the second detection signal by using the generated spatial filter. For example, the speech enhancement unit 105 applies the spatial filter F(f,n) to the frequency spectrum X(f,n) according to the above formula (6), and thereby obtains a frequency spectrum value Y(f,n).

In step S506, the speech enhancement unit 105 operates as the ISTFT unit 305, and transforms the frequency spectrum values obtained for frames and frequency bins into a time domain.

In this manner, the speech enhancement unit 105 generates an acoustic signal with noise suppressed and utterance of a command word enhanced, from the detection signals obtained by the microphones 101 to 104.

As described above, the signal processing apparatus according to the first embodiment is configured to consider a continuous sound source as noise and enhance a head portion of a new sound source. Thereby, a beamformer that enhances a short utterance can be obtained with a low computation amount. As a result, an effect that even a terminal with low computation performance can operate in real time can be achieved. Furthermore, it is possible to suppress the noise that should be suppressed even when the noise includes speech. Therefore, the signal processing apparatus according to the first embodiment can effectively enhance a target speech.

Second Embodiment

A configuration of a spectrum enhancement unit according to a second embodiment differs from that of the first embodiment. The elements other than the spectrum enhancement unit according to the second embodiment are the same as those of the first embodiment. As such, a description of the elements other than the spectrum enhancement unit will be omitted. In the second embodiment, the spatial correlation matrix $\Phi_S(f,n)$ is obtained by multiplying the frequency spectrum X(f,n) by a mask. The mask represents a proportion of a target signal to a detection signal at each time-frequency point, that is, a proportion in which a frequency spectrum of each time frame and each frequency bin includes speech to be enhanced. If the mask is appropriately estimated, a noise component can be removed from the spatial correlation matrix $\Phi_S(f,n)$, and improvement of the performance of the spatial filter can be expected.

Figure 6:
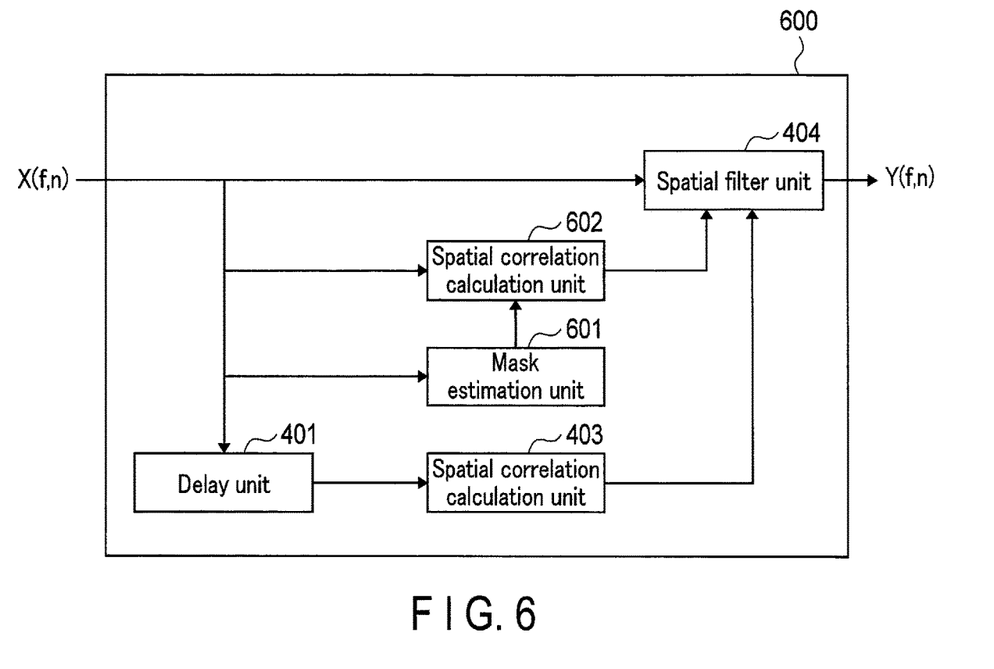
FIG. 6 is a block diagram showing an example of a configuration of a spectrum enhancement unit according to a second embodiment.

FIG. 6 is a block diagram schematically showing an example of the configuration of the spectrum enhancement unit according to the second embodiment. In FIG. 6, the same elements as those shown in FIG. 4 are denoted by the same reference symbols, and a description of those elements will be omitted.

The spectrum enhancement unit 600 shown in FIG. 6 includes a mask estimation unit 601, a spatial correlation calculation unit 602, the delay unit 401, the spatial correlation calculation unit 403, and the spatial filter unit 404.

The mask estimation unit 601 estimates a mask M(f,n) based on the frequency spectrum X(f,n). The mask M(f,n) is a scalar value that satisfies 0<M(f,n)<1. The mask M(f,n) can be estimated using a neural network which receives an absolute value of the frequency spectrum X(f,n) (amplitude spectrum) as input. First, a mask $M_m(f,n)$ corresponding to each microphone is estimated from an amplitude spectrum $|M_m(f,n)|$, and the mask M(f,n) is obtained as a median of the masks $M_m(f,n)$.

An input vector v(n) and an output vector u(n) of the neural network for estimating the masks $M_m(F,n)$ are defined by, for example, the following formulae (10) and (11), respectively:

$$v(n)=[\log|X_m(0,n)|, \ldots, \log|X_m(128,n)|, \log|X_m(0,n-1)|, \ldots, \log|X_m(128,n-1)|] \quad (10)$$

$$u(n)=[M_m(0,n), M_m(1,n), \ldots, M_m(128,n)] \quad (11)$$

The neural network may be configured as a fully-connected network having 258 nodes in an input layer, 129 nodes in an output layer, and 200 nodes in each of three intermediate layers, and may use a sigmoid function as an activating function.

Training of the neural network may be implemented using data including a segment of noise-superimposed speech and a correct value of the mask as teaching data. A correct value of the mask corresponding to a noise-superimposed speech may be obtained by preparing clean speech data and noise data and performing simulation using the clean speech data and noise data. Cross-entropy may can be used as a loss function. Any method such as a stochastic gradient descent method may be used for optimization of the network.

The spatial correlation calculation unit 602 calculates the spatial correlation matrix $\Phi_S(f,n)$ based on the frequency spectrum $X(f,n)$ and the mask $M(f,n)$. For example, the spatial correlation calculation unit 602 calculates the spatial correlation matrix $\Phi_S(f,n)$ according to the following formula (12):

$$\Phi_S(f, n) = \sum_{t=0}^{\tau_S-1} w_S(t) \, M(f, n-t) X(f, n-t) X(f, n-t)^H \tag{12}$$

The spectrum enhancement unit 600 configured as described above can calculate the spatial correlation matrix $\Phi_S(f,n)$ by suppressing a noise spectrum of a detection signal as of the current time. Thereby, a spatial filter that delivers more accurate enhancement of speech can be obtained. As a result, a signal-to-noise ratio (SNR) is improved.

Figure 7:
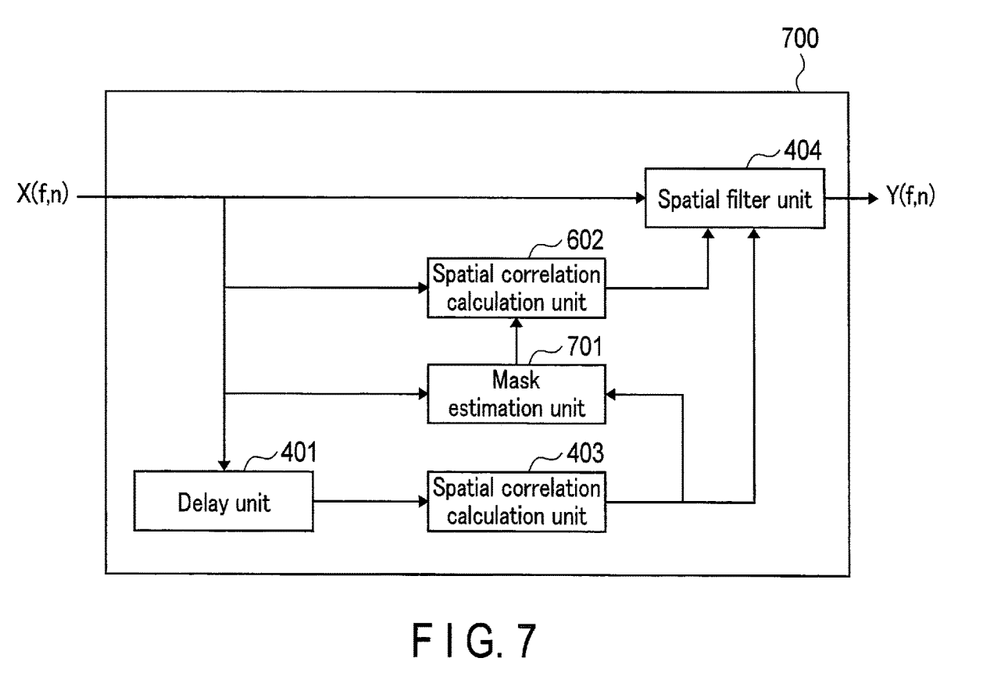
FIG. 7 is a block diagram showing another example of the configuration of the spectrum enhancement unit according to the second embodiment.

FIG. 7 is a block diagram schematically showing another example of the configuration of the spectrum enhancement unit according to the second embodiment. In FIG. 7, the same elements as those shown in FIGS. 4 and 6 are denoted by the same reference symbols, and a description of those elements will be omitted. Whereas the spectrum enhancement unit 600 shown in FIG. 6 estimates the mask by using the neural network based on the difference in spectrum between the speech and the noise, the spectrum enhancement unit 700 shown in FIG. 7 estimates the mask based on the difference in arrival direction between the speech and the noise.

The spectrum enhancement unit 700 shown in FIG. 7 includes a mask estimation unit 701, the spatial correlation calculation unit 602, the delay unit 401, the spatial correlation calculation unit 403, and the spatial filter unit 404.

The mask estimation unit 601 estimates the mask $M(f,n)$ based on the frequency spectrum $X(f,n)$ and the spatial correlation matrix $\Phi_N(f,n)$. The spatial correlation matrix $\Phi_N(f,n)$ allows for estimation of the mask based on the difference between the speech and the noise in the arrival direction.

When the noise source is modeled in a Gaussian distribution with zero mean, a frequency spectrum of the noise can be modeled in a multivariate complex Gaussian distribution where the spatial correlation matrix $\Phi_N(f,n)$ is regarded as a covariance matrix. A probability density function $p_N(X(f,n))$ is provided by the following formula (13):

$$p_N(X(f, n)) = \frac{1}{\det(\pi \phi(f, n) \Phi_N(f, n))} \exp\{-X(f, n)^H (\phi(f, n) \Phi_N(f, n))^{-1} X(f, n)\} \tag{13}$$

wherein det denotes the determinant, and $\phi(f,n)$ denotes variance. When the variance $\phi(f,n)$ is replaced by a parameter estimated by the maximum likelihood method, the formula (13) can be transformed into the following formula (14):

$$p_N(X(f, n)) = \frac{C}{\det(\Phi_N(f, n))\{X(f, n)^H \Phi_N(f, n)^{-1} X(f, n)\}^M} \tag{14}$$

wherein M denotes the number of microphones, and C denotes a constant. On the other hand, in regard to the speech to be enhanced, there is no information on a covariance matrix; therefore, a unit matrix is set as an initial value, and the same formula transformation as that performed for the formula (14) is performed to obtain the following formula (15) representing a probability density function $p_S(X(f,n))$:

$$p_S(X(f, n)) = \frac{C}{\{X(f, n)^H X(f, n)\}^M} \tag{15}$$

The mask $M(f,n)$ can be obtained according to the following formula (16):

$$M(f, n) = \frac{p_S(X(f, n))}{p_S(X(f, n)) + p_N(X(f, n))} \tag{16}$$

The spatial correlation calculation unit 602 calculates the spatial correlation matrix $\Phi_S(f,n)$ according to the above formula (12) using the mask $M(f,n)$ estimated by the mask estimation unit 601. The spatial filter unit 404 can generate a spatial filter based on the calculated spatial correlation matrix $\Phi_S(f,n)$.

The probability density function $p_S(X(f,n))$ and the mask $M(f,n)$ may be updated using the calculated spatial correlation matrix $\Phi_S(f,n)$. The spatial correlation calculation unit 602 calculates the probability density function $p_S(X(f,n))$ again, for example, according to the following formula (17):

$$p_S(X(f, n)) = \frac{C}{\det(\Phi_S(f, n))\{X(f, n)^H \Phi_S(f, n)^{-1} X(f, n)\}^M} \tag{17}$$

The spatial correlation calculation unit 602 calculates the mask again according to the above formula (16) using the calculated probability density function $p_S(X(f,n))$. Updating of the mask in this manner may be repeated a predetermined number of times.

As described above, the signal processing apparatus according to the second embodiment estimates the mask based on the difference between the speech and the noise in the spectrum or arrival direction, and calculates the spatial correlation matrix of the signal using the estimated mask. Thereby, a spatial filter that delivers more accurate enhancement of speech can be obtained. Therefore, the signal processing apparatus according to the second embodiment can enhance a target speech more effectively.

Third Embodiment

A signal processing apparatus according to a third embodiment corresponds to a signal processing apparatus obtained by adding a setting unit for the setting of a delay time to the signal processing apparatus of the first embodiment.

Figure 8:
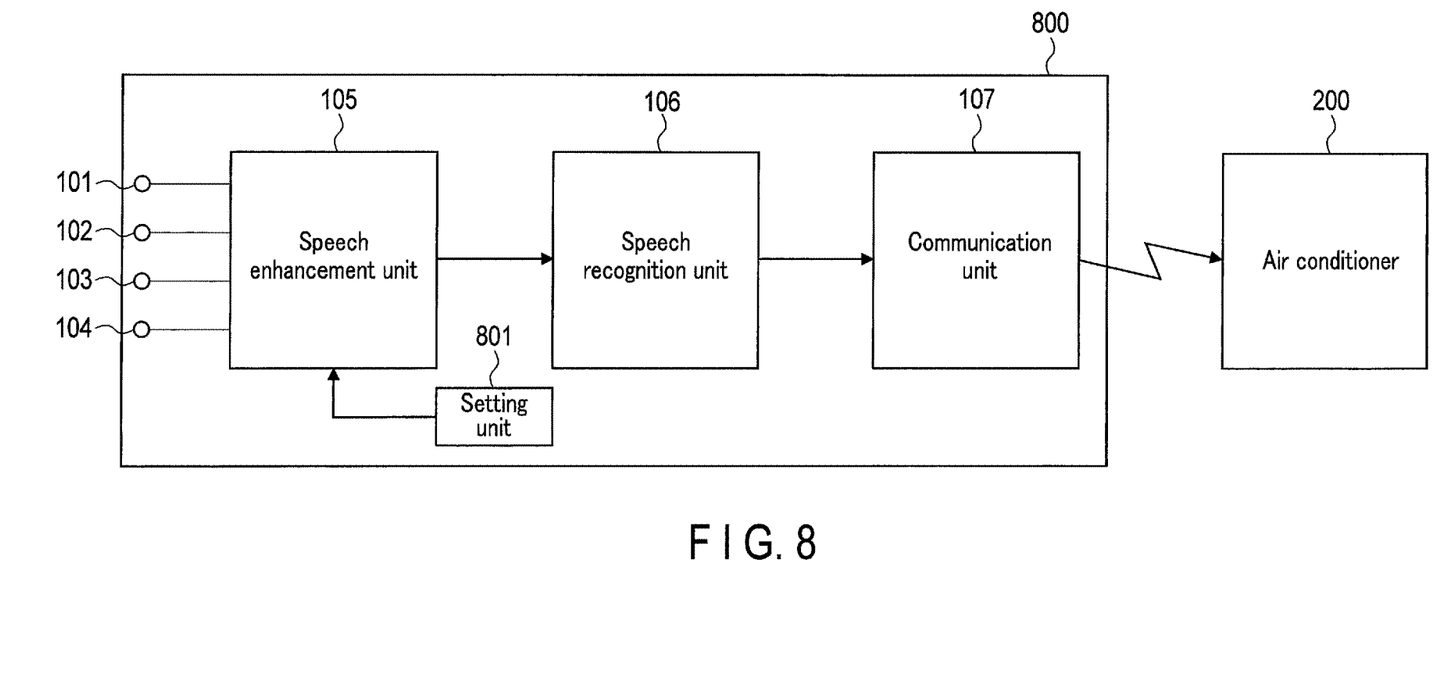
FIG. 8 is a block diagram showing a remote controller including a signal processing apparatus according to a third embodiment.
Figure 9:
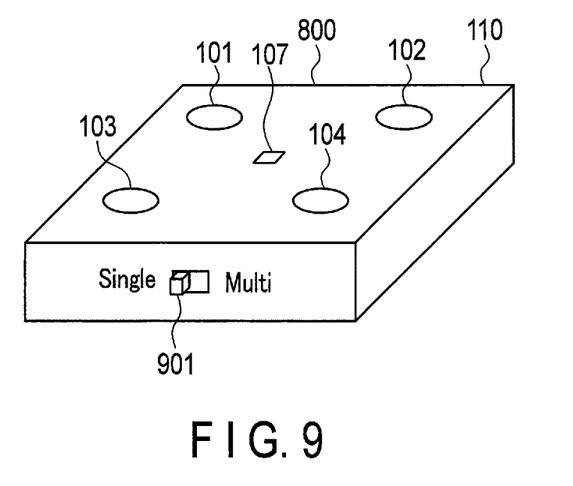
FIG. 9 is a perspective view showing an external appearance of the remote controller shown in FIG. 8.

FIG. 8 is a block diagram schematically showing a remote controller 800 including the signal processing apparatus according to the third embodiment. FIG. 9 is a perspective view schematically showing an external appearance of the remote controller 800. In FIGS. 8 and 9, the same elements as those shown in FIGS. 1 and 2 are denoted by the same reference symbols, and a description of those elements will be omitted.

As shown in FIG. 8, the remote controller 800 includes the microphones 101 to 104, the speech enhancement unit 105, the speech recognition unit 106, the communication unit 107, and a setting unit 801. The setting unit 801 sets the number of delay frames (delay time) used by the delay unit 401 in the speech enhancement unit 105.

As shown in FIG. 9, the remote controller 800 is provided with a switch 901. The switch 901 is switched between "Single" and "Multi." When the switch 901 is on the "Single" side, the remote controller 800 performs the same operation as the remote controller 100 of the first embodiment. In the first embodiment, words such as "turn on the switch" and "raise the temperature" are set as command words. If a voice-controlled device other than an air conditioner is installed, the remote controller may respond to a user's speech uttered to operate the device, likely causing the air conditioner to be operated.

When the switch 901 is switched to the "Multi" side, the remote controller 800 functions to change the command words to "air conditioner, turn on the switch" and "air conditioner, raise the temperature," both of which include the words "air conditioner" in the head. This function can be implemented by switching the list of command words stored in the speech recognition unit 106. Also, since the duration of the utterance of the command word is increased by the addition of the words "air conditioner", the setting unit 801 increases the number of delayed frames used by the delay unit 401. For example, when the switch 901 is on the "Multi" side, the setting unit 801 sets the delay time to two seconds, that is, sets the number of delay frames to 250.

As described above, the signal processing apparatus according to the third embodiment is configured to be able to change the delay time. Therefore, the signal processing apparatus can be applied to a voice-activated device (such as a remote controller) capable of switching between command words having different lengths.

An element such as a multistage switch provided separately from the switch 901 may be used to adjust the delay time in stages. The recognition performance can be improved in accordance with the speed of the user's utterance by minutely adjusting the delay time.

Fourth Embodiment

A fourth embodiment relates to a modification of the operation performed when the switch described in the third embodiment is switched to the "Multi" side. In the third embodiment, when the switch is switched to the "Multi" side, the words "air conditioner" are added to all the command words. In the fourth embodiment, when the switch is switched to the "Multi" side, one command word, which is "air conditioner," is added.

Figure 10:
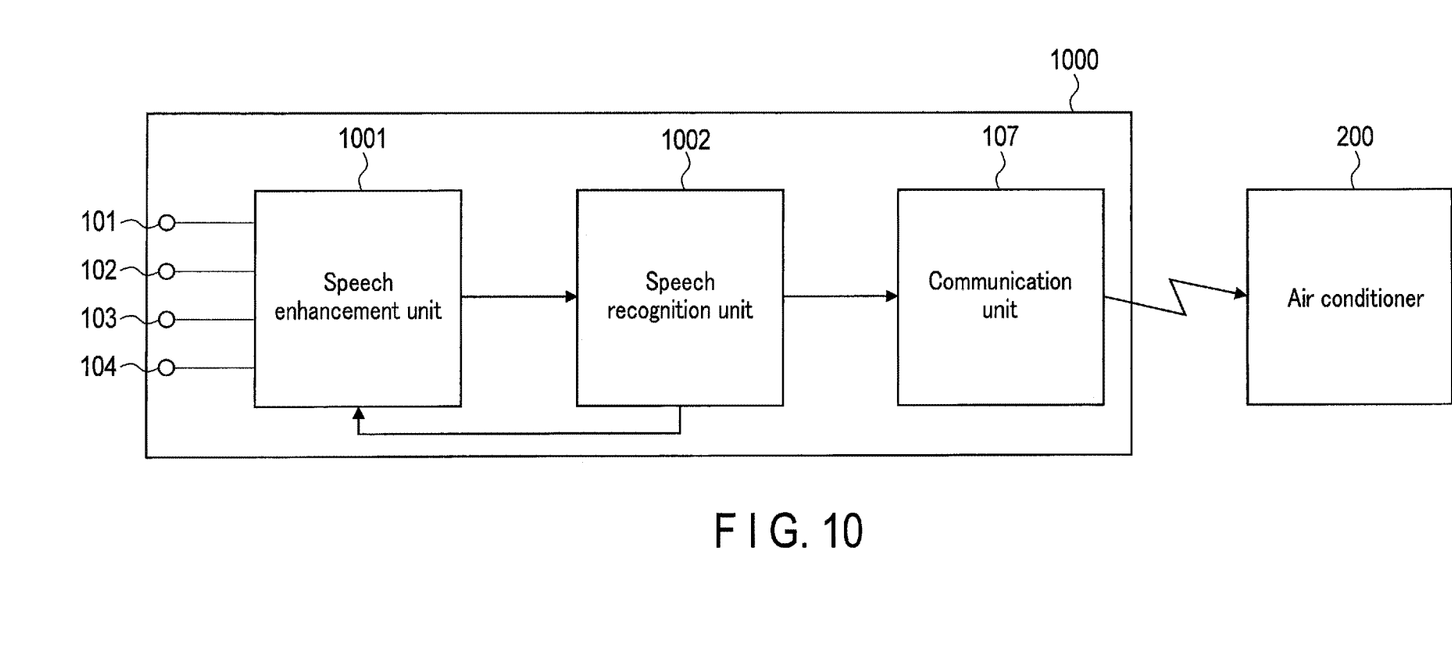
FIG. 10 is a block diagram showing a remote controller including a signal processing apparatus according to a fourth embodiment.

FIG. 10 is a block diagram schematically showing a remote controller 1000 including a signal processing apparatus according to the fourth embodiment. In FIG. 10, the same elements as those shown in FIG. 1 are denoted by the same reference symbols, and a description of those elements will be omitted. As shown in FIG. 10, the remote controller 1000 includes the microphones 101 to 104, a speech enhancement unit 1001, a speech recognition unit 1002, and the communication unit 107.

When the switch is switched to the "Multi" side, the speech enhancement unit 1001 performs the same operation as that performed by the speech enhancement unit 105 of the first embodiment, and the speech recognition unit 1002 transitions to a state of waiting for "air conditioner" that is one of the command words. When the speech recognition unit 1002 detects the command word "air conditioner," the speech recognition unit 1002 notifies the speech enhancement unit 1001 that the command word "air conditioner" have been detected, and, immediately thereafter transitions to a state of waiting for command words other than "air conditioner." If the speech recognition unit 1002 detects any one of the command words other than "air conditioner," the speech recognition unit 1002 outputs a command word ID that identifies the detected command word, and returns to the state of waiting for the command word "air conditioner." If the speech recognition unit 1002 fails to detect any of the command words other than "air conditioner" by the time a predetermined time elapses after the transition of the state, the speech recognition unit 1002 returns to the state of waiting for the command word "air conditioner."

Figure 11:
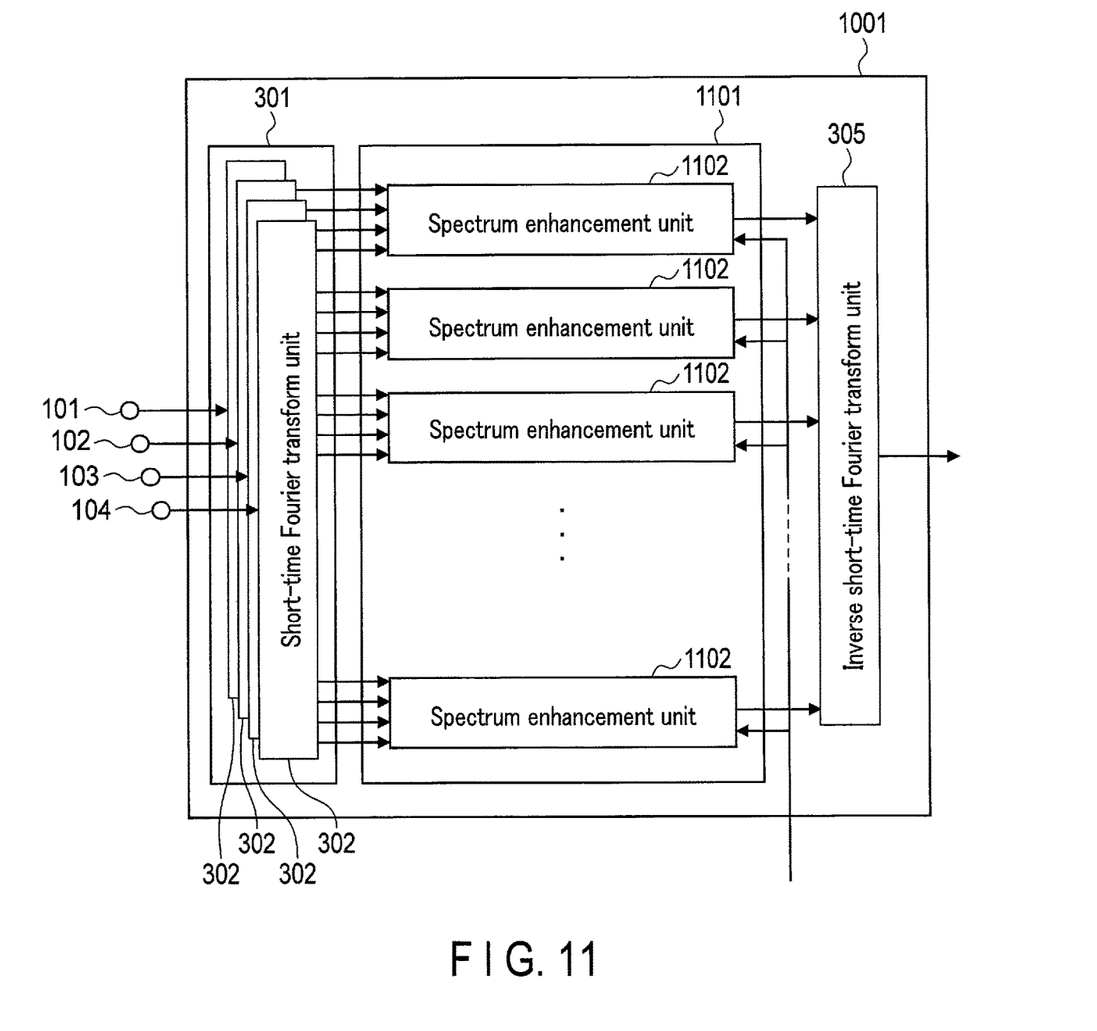
FIG. 11 is a block diagram showing an example of a configuration of a speech enhancement unit shown in FIG. 10.

FIG. 11 is a block diagram schematically showing an example of a configuration of the speech enhancement unit 1001. In FIG. 11, the same elements as those shown in FIG. 3 are denoted by the same reference symbols, and a description of those elements will be omitted. As shown in FIG. 11, the speech enhancement unit 1001 includes the transform unit 301, an enhancement unit 1101, and the ISTFT unit 305.

The enhancement unit 1101 receives a frequency spectrum X(f,n) from the transform unit 301. The enhancement unit 1101 performs spectrum enhancement on the frequency spectrum X(f,n) for each frame and each frequency bin. Specifically, the enhancement unit 1101 includes 129 spectrum enhancement units 1102 respectively corresponding to 129 frequency bins. Each of the spectrum enhancement units 1102 receives a frequency spectrum X(f,n) of its corresponding frequency bin from the transform unit 301, and performs spectrum enhancement on the received frequency spectrum X(f,n). The spectrum enhancement unit 1102 receives, from the speech recognition unit 1002, a notification indicating that the command word "air conditioner" have been detected. The details of the respective spectrum enhancement units 1102 will be described later with reference to FIG. 12.

Figure 12:
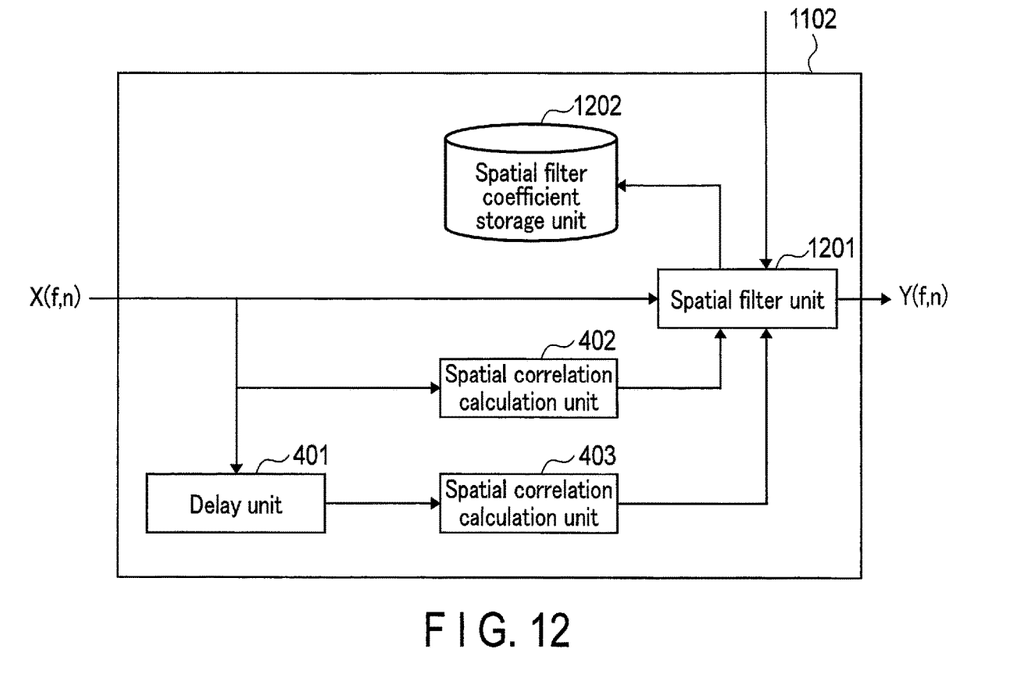
FIG. 12 is a block diagram showing an example of a configuration of a spectrum enhancement unit shown in FIG. 11.

FIG. 12 schematically shows an example of a configuration of the spectrum enhancement unit 1102. The spectrum enhancement unit 1102 shown in FIG. 12 corresponds to each of the spectrum enhancement units 1102 shown in FIG. 11. In FIG. 12, the same elements as those shown in FIG. 4 are denoted by the same reference symbols, and a description of those elements will be omitted.

As shown in FIG. 12, the spectrum enhancement unit 1102 includes the delay unit 401, the spatial correlation calculation unit 402, the spatial correlation calculation unit 403, a spatial filter unit 1201, and a spatial filter coefficient storage unit 1202.

The spatial filter unit 1201 generates a spatial filter in a manner similar to the spatial filter unit 404 described in the first embodiment, and stores a coefficients, which form the spatial filter, in the spatial filter coefficient storage unit 1202. The spatial filter coefficient storage unit 1202 stores spatial filter coefficients for the current frame to a frame prior to the current frame by a predetermined time.

When the spatial filter unit 1201 receives a notification from the speech recognition unit 1002, the spatial filter unit 1201 stops updating the spatial filter, and reads, from the spatial filter coefficient storage unit 1202, spatial filter coefficients regarding a frame prior to the current frame by a predetermined time (e.g., 0.3 second). The spatial filter unit 1201 sets the read spatial filter coefficients in the spatial filter. The spatial filter unit 1201 fixates the spatial filter to perform filtering while the speech recognition unit 1002 is in a state of waiting for a command word other than "air conditioner."

When the command word "air conditioner" is detected, the utterance of the command word "air conditioner" has already been completed. Therefore, it is possible to utilize a stable spatial filter obtained during the utterance of the command word "air conditioner" by utilizing a spatial filter obtained approximately 0.3 second prior to the current time, for example.

Since one command word "air conditioner" are awaited in the fourth embodiment, occurrences of a false operation decrease, as compared to the third embodiment. Furthermore, since the duration of the utterance of the command word is kept small, the signal processing apparatus relatively robustly operates even in the instance of unsteady noise. Since the effect of speech enhancement lasts in a command word portion subsequent to the command word "air conditioner" as well, an effect of improved accuracy of recognition is achieved.

In place of the spatial filter coefficients, information such as output of the spatial correlation calculation units 402 and 403 or a frequency spectrum may be stored, so that the spatial filter unit 1201 generates a spatial filter again based on the information. Generating a spatial filter by utilizing past data in an appropriate section may allow for further improvement of the effect of speech enhancement.

The processing described above in regard to each of the embodiments may be implemented by processing circuitry such as a general-purpose processor.

Figure 13:
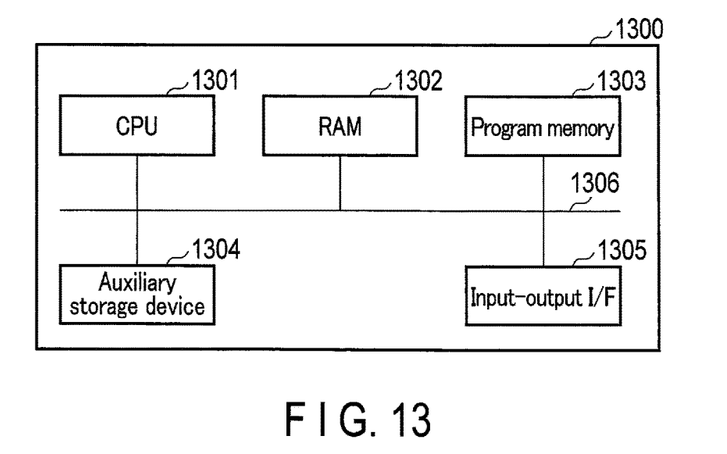
FIG. 13 is a block diagram showing an example of a hardware configuration of a signal processing apparatus according to an embodiment.

FIG. 13 is a block diagram showing an example of a hardware configuration of a computer 1300 according to an embodiment. As shown in FIG. 13, the computer 1300 includes, as hardware, a CPU (central processing unit) 1301, a RAM (random access memory) 1302, a program memory 1303, an auxiliary storage device 1304, an input-output interface 1305, and a bus 1306. The CPU 1301 communicates with the RAM 1302, program memory 1303, auxiliary storage device 1304, and input-output interface 1305 via the bus 1306.

The CPU 1301 is an example of the general-purpose processor. The RAM 1302 is used by the CPU 1301 as a working memory. The RAM 1302 includes a volatile memory such as a SDRAM (synchronous dynamic random access memory). The program memory 1303 stores various programs including a signal processing program. For example, a ROM (read-only memory), a part of the auxiliary storage device 1304, or a combination thereof is used as the program memory 1303. The auxiliary storage device 1304 non-transitorily stores data. The auxiliary storage device 1304 includes a non-volatile memory such as a hard disk drive (HDD) or a solid state drive (SSD).

The input-output interface 1305 is an interface for connecting with another device. The input-output interface 1305 is used for connection with the microphones 101 to 104 and the communication unit 107, for example.

Each of the programs stored in the program memory 1303 includes a computer-executable instruction. The program (computer-executable instruction), when executed by the CPU 1301, causes the CPU 1301 to perform predetermined processing. For example, the signal processing program, when executed by the CPU 1301, causes the CPU 1301 to perform a series of processing described in regard to the speech enhancement unit and the speech recognition unit.

The program may be provided to the computer 1300 while the program is stored in a computer-readable storage medium. In this case, the computer 1300, for example, further includes a drive (not shown) that reads data from the storage medium, and obtains the program from the storage medium. Examples of the storage medium include magnetic disks, optical disks (such as CD-ROM, CD-R, DVD-ROM, and DVD-R), magneto-optical disks (such as MO), and semiconductor memories. Also, the program may be stored in a server over a communication network, so that the computer 1300 downloads the program from the server by using the input-output interface 1305.

The processing described in the embodiments need not necessarily be performed by a general-purpose hardware processor, such as the CPU 1301, executing the program, and may be performed by a dedicated hardware processor such as an ASIC (application specific integrated circuit). The term "processing circuitry" includes at least one general-purpose hardware processor, at least one dedicated hardware processor, or a combination of at least one general-purpose hardware processor and at least one dedicated hardware processor. In the example shown in FIG. 13, the CPU 1301, RAM 1302, and program memory 1303 all correspond to the processing circuitry.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A signal processing apparatus comprising:
processing circuitry configured to:
transform a first detection signal into a time-frequency domain to obtain a second detection signal, the first detection signal obtained by detecting sound at each of different positions;
calculate a first spatial correlation matrix based on the second detection signal from a first time to a second time such that contribution of the second detection signal from a third time to the second time is larger than contribution of the second detection signal from the first time to the third time, the third time being a time that is prior to the second time by a predetermined time;
calculate a second spatial correlation matrix based on a third detection signal obtained by delaying the second detection signal by a predetermined time; and
generate a spatial filter based on the first spatial correlation matrix and the second spatial correlation matrix, and filter the second detection signal by using the spatial filter.

2. The signal processing apparatus according to claim 1, wherein the processing circuitry is further configured to estimate a mask based on the second detection signal, the mask representing a proportion of a target signal to the first detection signal at each time-frequency point, and
wherein the processing circuitry is configured to calculate the first spatial correlation matrix based on the second detection signal and the mask.

3. The signal processing apparatus according to claim 2, wherein the processing circuitry is configured to estimate the mask by estimating a difference in arrival direction between noise and the target signal based on the second detection signal and the second spatial correlation matrix.

4. The signal processing apparatus according to claim 2, wherein the processing circuitry is configured to estimate the mask by estimating a difference in spectrum between noise and the target signal based on the second detection signal.

5. The signal processing apparatus according to claim 1, wherein the processing circuitry is further configured to se the predetermined time.

6. The signal processing apparatus according to claim 1, wherein the spatial filter is a maximum signal-to-noise ratio beamformer, where the first spatial correlation matrix is a spatial correlation matrix of a signal, and the second spatial correlation matrix is a spatial correlation matrix of noise.

7. The signal processing apparatus according to claim 1, wherein the processing circuitry is further configured to:
   perform detection of a preregistered keyword with respect to a signal obtained by filtering the second detection signal by using the spatial filter; and
   store in a memory information regarding at least one of spatial filter coefficients that forms the spatial filter, the first spatial correlation matrix, or the second spatial correlation matrix, and
   wherein the processing circuitry is configured to generate the spatial filter based on the information stored in the memory when the key word is detected.

8. A signal processing method performed by a signal processing apparatus, the method comprising:
   transforming a first detection signal into a time-frequency domain to obtain a second detection signal, the first detection signal obtained by detecting sound at each of different positions;
   calculating a first spatial correlation matrix based on the second detection signal from a first time to a second time such that contribution of the second detection signal from a third time to the second time is larger than contribution of the second detection signal from the first time to the third time, the third time being a time that is prior to the second time by a predetermined time;
   calculating a second spatial correlation matrix based on a third detection signal obtained by delaying the second detection signal by a predetermined time;
   generating a spatial filter based on the first spatial correlation matrix and the second spatial correlation matrix; and
   filtering the second detection signal by using the spatial filter.

9. A non-transitory computer readable medium including computer executable instructions, wherein the instructions, when executed by a processor, cause the processor to perform a method comprising:
   transforming a first detection signal into a time-frequency domain to obtain a second detection signal, the first detection signal obtained by detecting sound at each of different positions;
   calculating a first spatial correlation matrix based on the second detection signal from a first time to a second time such that contribution of the second detection signal from a third time to the second time is larger than contribution of the second detection signal from the first time to the third time, the third time being a time that is prior to the second time by a predetermined time;
   calculating a second spatial correlation matrix based on a third detection signal obtained by delaying the second detection signal by a predetermined time;
   generating a spatial filter based on the first spatial correlation matrix and the second, spatial correlation matrix; and
   filtering the second detection signal by using the spatial filter.

* * * * *